United States Patent
Brochard et al.

(10) Patent No.: US 11,069,087 B2
(45) Date of Patent: Jul. 20, 2021

(54) METHOD FOR DETERMINING PROJECTING EDGES OF A TARGET ON AN IMAGE

(71) Applicant: Airbus Defence and Space SAS, Toulouse (FR)

(72) Inventors: Roland Brochard, Toulouse (FR); Cyril Robin, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 16/955,428

(22) PCT Filed: Dec. 19, 2018

(86) PCT No.: PCT/FR2018/053393
§ 371 (c)(1),
(2) Date: Jun. 18, 2020

(87) PCT Pub. No.: WO2019/122703
PCT Pub. Date: Jun. 27, 2019

(65) Prior Publication Data
US 2021/0012528 A1   Jan. 14, 2021

(30) Foreign Application Priority Data

Dec. 20, 2017 (FR) ...................... 17 62587

(51) Int. Cl.
*G06T 7/73* (2017.01)
*G06T 7/55* (2017.01)
*G06K 9/00* (2006.01)

(52) U.S. Cl.
CPC .............. *G06T 7/75* (2017.01); *G06K 9/0063* (2013.01); *G06K 9/00208* (2013.01); *G06T 7/55* (2017.01);
(Continued)

(58) Field of Classification Search
CPC ............. G06T 7/75; G06T 2207/10032; G06T 2207/30252; G06T 7/55; G06T 2200/04;
(Continued)

(56) References Cited

PUBLICATIONS

Kelsey, Jed M., et al. "Vision-based relative pose estimation for autonomous rendezvous and docking." 2006 IEEE aerospace conference. IEEE, 2006. (Year: 2006).*

(Continued)

*Primary Examiner* — Geoffrey E Summers
(74) *Attorney, Agent, or Firm* — Nixon & Vanderhye P.C.

(57) ABSTRACT

A method for locating a three-dimensional target with respect to a vehicle is disclosed including capturing an image of the target, and from a three-dimensional mesh of the target, and from an estimation of the pose of the target, determining a set of projecting edges of the mesh of the target in the pose. The step of determining the projecting edges of the mesh of the target includes positioning the mesh of the target according to the pose, projecting in two dimensions the mesh so positioned, scanning the projection of the mesh in a plurality of scanning rows and, for each scanning row: defining a set of segments, each segment corresponding to the intersection of a face of the mesh with the scanning row and being defined by its ends, analyzing the relative depths of the ends of the segments, the depth being the position along a third dimension orthogonal to the two dimensions of the projection, in order to select a set of end points of segments corresponding to projecting edges of the mesh.

16 Claims, 3 Drawing Sheets

1 3D model
2 Projecting edges
3 Input image
4 Mapping
5 Matching edges
6, 7, 8 Step

(52) U.S. Cl.
CPC .............. *G06T 2207/10032* (2013.01); *G06T 2207/30252* (2013.01)

(58) Field of Classification Search
CPC ............ G06K 9/0063; G06K 9/00208; G06K 9/3241; G06K 9/50
USPC ........................................................ 382/103
See application file for complete search history.

(56) References Cited

PUBLICATIONS

Agoston, Max K. Computer Graphics and Geometric Modeling: Implementation and Algorithms. Springer, 2005. (Year: 2005).*
Lourakis, Manolis, and Xenophon Zabulis. "Model-based visual tracking of orbiting satellites using edges." 2017 IEEE/RSJ International Conference on Intelligent Robots and Systems (IROS). IEEE, 2017. (Year: 2017).*
Van de Panne M., Stewart A.J. (1999) Effective Compression Techniques for Precomputed Visibility. In: Lischinski D., Larson G.W. (eds) Rendering Techniques' 99. EGSR 1999. Eurographics. Springer, Vienna, https://doi.org/10.1007/978-3-7091-6809-7_27 (Year: 1999).*
Agoston, Computer Graphics and Geometric Modeling, Implementation and Algorithms, Section "7.8 The Watkins Scan Line Algorithm", pp. 278-283, Springer 2005.
Klawonn, Introduction to Computer Graphics, Using Java 2D and 3D, Section "7.3.2 Scan Line Technique for Edges", pp. 190-195, Springer 2008.
Rogers, Procedural Elements of Computer Graphics, Second Ed., Sections "4-14 Scan Line Algorithms", "4-15 Scan Line z-Buffer Algorithm", pp. 401-417, McGraw-Hill 1997.
Xiang et al., Schaum's Outline of Computer Graphics, Section "10.5 Scan-Line Algorithm", pp. 203-207, McGraw-Hill 2000.
English translation of the Written Opinion for International Application No. PCT/FR2018/053393, six pages, dated Apr. 3, 2019.
English translation of the International Search Report for PCT/FR2018/053393 dated Apr. 3, 2019, 2 pages.
French Search Report and Opinion for FR17 62587 dated Sep. 6, 2018, 10 pages.
A. Petit et al., "A robust model-based tracker combining geometrical and color edge information", 2013 IEEE/RSJ International Conference on Intelligent Robots and Systems, IEEE, Nov. 3, 2013, pp. 3719-3724.
A. Petit et al., "Vision-based Detection and Tracking for Space Navigation in a Rendezvous Context", Int. Symp. on Artificial Intelligence, Robotics and Automation in Space, *i-SAIRAS*, Nov. 11, 2012, pp. 1-9.
J. M. Kelsey et al., "Vision-Based Relative Pose Estimation for Autonomous Rendezvous and Docking", 2006 IEEE Aerospace Conference, Mar. 4, 2006, pp. 1-20.
M. Wheeler, "Automatic Modeling and Localization for Object Recognition—PhD thesis CMU-CS-96-188", In: Automatic Modeling and Localization for Object Recognition—PhD thesis CMU-CS-96-188, Carnegie Mellon University, Oct. 25, 1996, pp. 1-230.
Nassir Oumer, "Visual Tracking and Motion Estimation for an On-Orbit Servicing of a Satellite—PhD Thesis", In: Visual Tracking and Motion Estimation for an On-Orbit Servicing of a Satellite—PhD Thesis, Universitat Osnabruck, Mar. 1, 2016, pp. 1-166.

\* cited by examiner

METHOD FOR DETERMINING PROJECTING EDGES OF A TARGET ON AN IMAGE

CROSS REFERENCE TO RELATED APPLICATIONS

The present application is a National Phase of International Application Number PCT/FR2018/053393 filed Dec. 19, 2018, which designated the U.S. and claims priority benefits from French Patent Application Number No. FR 17 62587 filed Dec. 20, 2017, the entire contents of each of which are hereby incorporated by reference.

FIELD OF THE INVENTION

The invention relates to a method for determining the projecting edges of a three-dimensional object in an image, based on a three-dimensional model of the object. The invention lies within a context of detecting and tracking a target, particularly in the case of air or space rendezvous.

STATE OF THE ART

An example of an air rendezvous is the refueling of an aircraft, which requires positioning a tanker aircraft equipped with a fueling boom (also known as a flying boom) relative to the aircraft to be refueled.

A space rendezvous is typically the docking of a space vehicle to a target such as the International Space Station.

In both cases, an approaching moving vehicle must be precisely positioned relative to a moving target whose three-dimensional structure can be complex. The navigation of the approaching vehicle is essentially based on the analysis of images of the moving target taken from the approaching vehicle, in order to accurately determine the "pose" of the moving target, in other words its relative position and its orientation with respect to the approaching vehicle.

More specifically, an image processing method for estimating the pose of the target comprises capturing images of the target from the vehicle at a frequency which depends on the speeds of the vehicle and target, then processing each image to determine the pose of the target in the image.

The processing of an image conventionally comprises a first step of detecting the target in the image, and a second step of determining the pose of the target.

With reference to FIG. 1, according to a known method, determining the pose of the target in the image can be implemented by using a three-dimensional model of the target and an estimation of the pose of the target in the image.

In this case, a first step 1 comprises determining the projecting edges of the model of the target in the pose corresponding to the estimation, then the three-dimensional model is mapped to the target during a step 2. Once the mapping is obtained between the model and the target, we can deduce that the pose of the model corresponds to the pose of the target in the image. An optimization step 3 makes it possible to refine the estimation of the pose.

Regarding the implementation of step 1, a method is known for determining the projecting edges of an object in an image, using a three-dimensional model of the object, during which the three-dimensional model of the object is projected according to a pose which corresponds to a first estimation of the pose of the object in the image, then each of the pixels of the image is visited in order to detect, as a function of the relative depths of the examined pixels, the projecting edges of the object in this image.

This technique has several disadvantages. On the one hand, the pixel-by-pixel processing of the image is very computation-heavy, and involves using a dedicated processing circuit for this purpose which is typically a graphics processing unit (also called GPU), in order to be able to keep up with the image stream frame rate and update the pose in real time.

In addition, the computing time depends on the size of the image, which requires limiting or even degrading the resolution of the stream of captured images compared to the current capabilities of the sensors used.

There is therefore a need for an alternative in which the complexity is better controlled.

PRESENTATION OF THE INVENTION

The object of the invention is to provide an improvement to existing solutions for detecting the projecting edges of an object in an image.

One object of the invention is to propose a method whose complexity is fully controlled, in order to be able to adapt this complexity to the computing capacities available in a device capable of carrying out a spatial or aerial rendezvous.

In particular, an object of the invention is to propose a method whose complexity is independent of the size of the images.

Another object of the invention is to allow the processing to be implemented by general hardware and not to require the use of a GPU.

In this regard, an object of the invention is a method for locating a three-dimensional target with respect to a vehicle, comprising:

capturing an image of the target, and
from a three-dimensional mesh of the target, and from an estimation of the pose of the target, determining a set of projecting edges of the mesh of the target in said pose, and the method being characterized in that the step of determining the projecting edges of the mesh of the target comprises:

a) positioning the mesh of the target according to the pose,
b) projecting in two dimensions the mesh so positioned,
c) scanning the projection of the mesh in a plurality of scanning rows and, for each scanning row:
defining a set of segments, each segment corresponding to the intersection of a face of the mesh with the scanning row and being defined by its ends,
analyzing the relative depths of the ends of the segments, the depth being the position along a third dimension orthogonal to the two dimensions of the projection, in order to select a set of end points of segments corresponding to projecting edges of the mesh.

Advantageously, the step of analyzing the relative depths of the ends of the segments comprises, for each segment end of a scanning row:

determining the set of segments superimposed at said end,
calculating the depth of the points of each of the superimposed segments at the segment end considered,
selecting the point having the lowest depth,
comparing the depth of the selected point to the depth of the last visible segment at the selected point, and
if the difference is greater than a determined threshold, determining that the selected point corresponds to a projecting edge of the mesh.

In one embodiment, each segment is further defined by the normal to the face to which the segment belongs, and the step of analyzing the relative depths of the ends of the segments further comprises, if the difference between the depth of the selected point and the depth of the last visible segment at the selected point is less than said threshold:

comparing the direction of the normal to the face to which the segment in which the selected point belongs, with the direction of the normal to the face to which the last visible segment belongs, and if the difference is greater than a determined threshold, determining that the selected point corresponds to a projecting edge of the mesh.

In some embodiments, the step of projecting the mesh in two dimensions further comprises calculating normals to the sides of the projection of each face of the mesh.

Advantageously, the scanning step c) is carried out once with horizontal scanning rows, and once with vertical scanning rows.

In one embodiment, the faces of the mesh are triangular, and defined by the spatial coordinates of the vertices of the triangle.

Preferably, the method further comprises, once the projecting edges of the mesh of the target are determined, a step of mapping the projecting edges of the mesh of the target to edges of the target in the image.

In one embodiment, the set of projecting edges of the mesh of the target comprises a set of elements of the mesh, each element being defined by:

the spatial coordinates of a point of the mesh, the coordinates of the two-dimensional projection of said point of the mesh, positioned according to said pose, and the direction of the normal of the mesh face in two dimensions at said point.

In this case, the mapping step comprises superimposing the two-dimensional projection of the mesh on the image, and for each element:

defining a window extending along the normal of the element, detecting an edge in the portion of the image corresponding to the window, and selecting a pixel of the image corresponding to the detected edge, as corresponding to the element.

Advantageously, the method further comprises a step of updating the estimation of the pose of the target in the image by minimizing the offset between the projecting edges of the mesh of the target and the corresponding points of the image.

In one embodiment, the method further comprises:

for each element of the mesh belonging to the set of projecting edges of the mesh, updating the coordinates of the two-dimensional projection of the point of the mesh, then repeating the step of mapping the projecting edges of the mesh to the edges of the target in the image.

The step of determining the projecting edges of the mesh may be implemented in a preliminary manner by a first computer of a ground station.

The method may also comprise the assigning of weighting coefficients to the elements of the set of projecting edges.

In one embodiment, the method comprises determining sets of projecting edges of the mesh positioned in a plurality of predetermined poses by the first computer, the method further comprising selecting a set of projecting edges of the mesh in one of the predetermined poses which best matches the pose of the target in the image, and implementing the mapping step on said selected set.

In one embodiment, the mesh of the target comprises several distinct parts, each point of the mesh comprising an identification of the part of the mesh to which it belongs, and the steps of projecting the mesh in two dimensions and scanning the projection of the mesh are only implemented for the parts of the mesh corresponding to parts of the target that are present in the image.

The invention also relates to a computer program product, comprising instructions for implementing a method for determining the projecting edges of a mesh of a three-dimensional object positioned according to a determined pose, comprising:

a) positioning the mesh of the object according to the pose, b) projecting in two dimensions the mesh so positioned, c) scanning the projection of the mesh in a plurality of scanning rows and, for each scanning row:

defining a set of segments, each segment corresponding to the intersection of a face of the mesh with the scanning row and being defined by its ends, analyzing the relative depths of the ends of the segments, the depth being the position along a third dimension orthogonal to the two dimensions of the projection, in order to select a set of end points of segments corresponding to the projecting edges of the mesh, when it is implemented by a computer.

An object of the invention is a system for locating a three-dimensional target with respect to a vehicle, comprising a sensor suitable for capturing images of the target, and a control unit comprising a computer and a memory, the system being characterized in that it is configured to implement the method according to the above description.

The method according to the invention makes it possible, by scanning a projection of the three-dimensional model of the object, with a set of scanning rows, to consider only the ends of segments corresponding to the intersection of the faces of the model with the scanning rows as potential elements of the model's projecting edges.

Thus it is not necessary to recreate all the pixels of an image corresponding to the projection of the three-dimensional model, but only certain points corresponding to edges are considered. As a result, the computing time required to implement the method is considerably reduced.

In addition, the complexity of the method is controlled because it depends only on the size of the three-dimensional model and the sampling rate performed with the scanning rows, and therefore not on the size of the images used as input to the method.

The implementation of the method therefore does not require specific hardware such as a GPU, and is therefore compatible with existing hardware, for example for installation in aircraft already in operation. The independence concerning the size of the image also makes it possible to use sensors for capturing the images which have better spatial resolution than those used in the prior art, which makes it possible to improve the overall accuracy of the image processing that is performed using these sensors.

The reduction of the computing time also makes it possible to add additional processing, for example to improve the robustness, integrity, or accuracy of the solution.

DESCRIPTION OF FIGURES

Other features, objects and advantages of the invention will emerge from the description which follows, which is purely illustrative and non-limiting, and which is to be read with reference to the appended drawings in which.

DETAILED DESCRIPTION OF AT LEAST ONE EMBODIMENT OF THE INVENTION

Figure 2A:
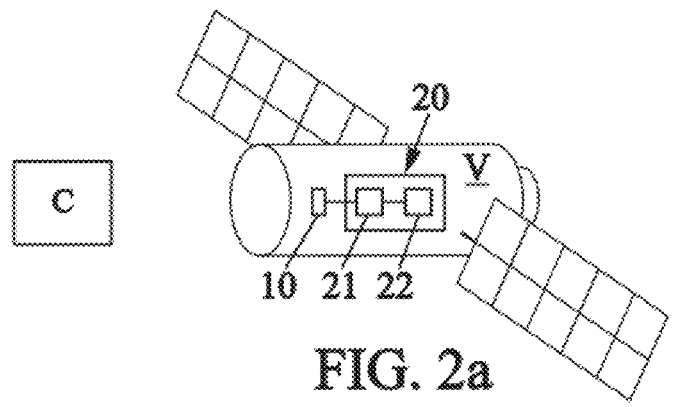
Figure 2B:
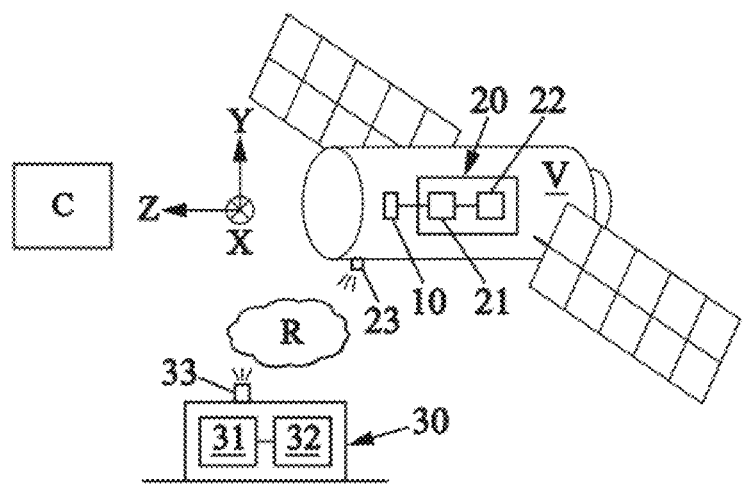

The main steps of a method for determining the projecting edges of an object in an image will now be described. With reference to FIGS. 2*a* and 2*b*, this method advantageously lies within a context of air or space rendezvous, where a vehicle such as a spacecraft or aircraft captures a stream of images of a target it is approaching, determines the pose of the target by real-time analysis of the captured images, and in real time adapts the commands for navigating the vehicle according to the pose so determined.

As will be seen in more detail further below, this method is therefore advantageously implemented in real time on a stream of images, at a frequency corresponding to the capture frequency of the images, this frequency being between 10 and 100 Hz, for example between 30 and 60 Hz.

FIG. 2*a* shows a first embodiment of a system for implementing the method. This system comprises a sensor 10, on board a vehicle V and suitable for capturing images of the target C. The sensor 10 may be a laser sensing device or LIDAR (acronym for "Light Detection And Ranging"), or a monocular or stereo camera.

The system further comprises a control unit 20 comprising at least one computer 21 and a memory 22. The computer is for example a processor or a microprocessor.

The memory stores the code instructions necessary for implementing all or part of the method, and the computer is able to execute these code instructions.

In an alternative embodiment shown in FIG. 2*b*, part of the method may be implemented on the ground in order to further reduce the calculations implemented by the onboard computer 21, and if necessary to allow the implementation of additional processing operations that could not be performed by the computer 21. This can also enable uniformity in the processing implemented by the ground system for several onboard vehicles equipped with different processing capabilities.

In this case, the system further comprises a processing unit 30 on the ground, comprising a memory 32 and a computer 31. Computer 31 and memory 32 then may have superior performance and characteristics than computer 21 and memory 22, because they are not constrained by the same integration and power supply issues as in the vehicle V.

Advantageously, the system may further comprise means of communication between the processing unit on the ground 30 and the onboard processing unit 20, these communication means each advantageously comprising wireless connection interfaces 23, 33 to a communication network T such as the Internet, for example by Wi-Fi, 3G, 4G, or by satellite communication.

Figure 3:
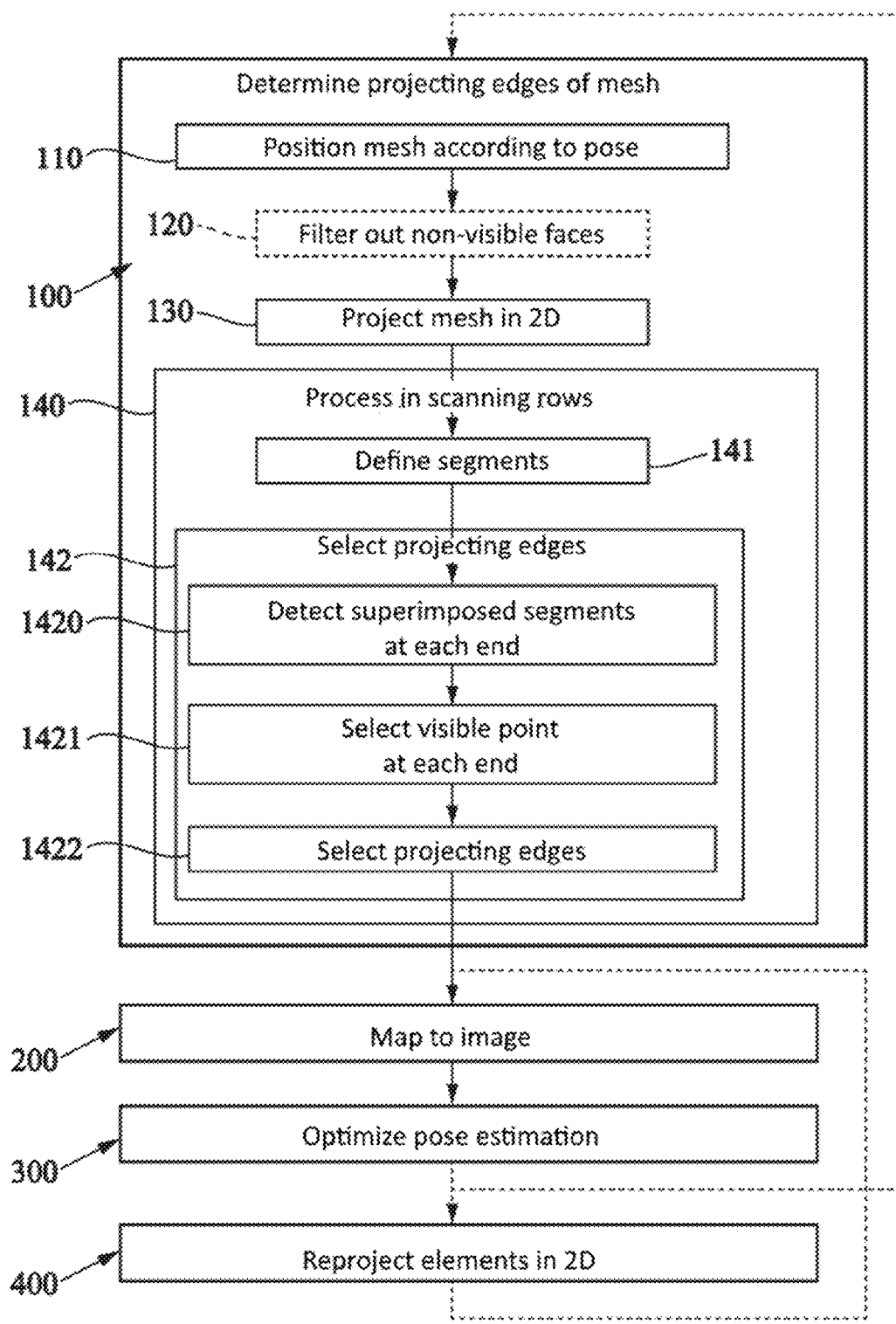
FIG. 3 schematically represents the main steps of a method according to one embodiment of the invention.

Referring to FIG. 3, the main steps of the method for determining the projecting edges of an object are represented.

The input data to the method comprise an image captured by the sensor 10 on board the vehicle V, in which the target C appears, the target being the object whose projecting edges are to be identified. Alternatively, the image on which the method is implemented may also come from a library of images stored on the ground, or may have been generated based on an initial assumption of relative positions between the vehicle and the target.

Figure 1:
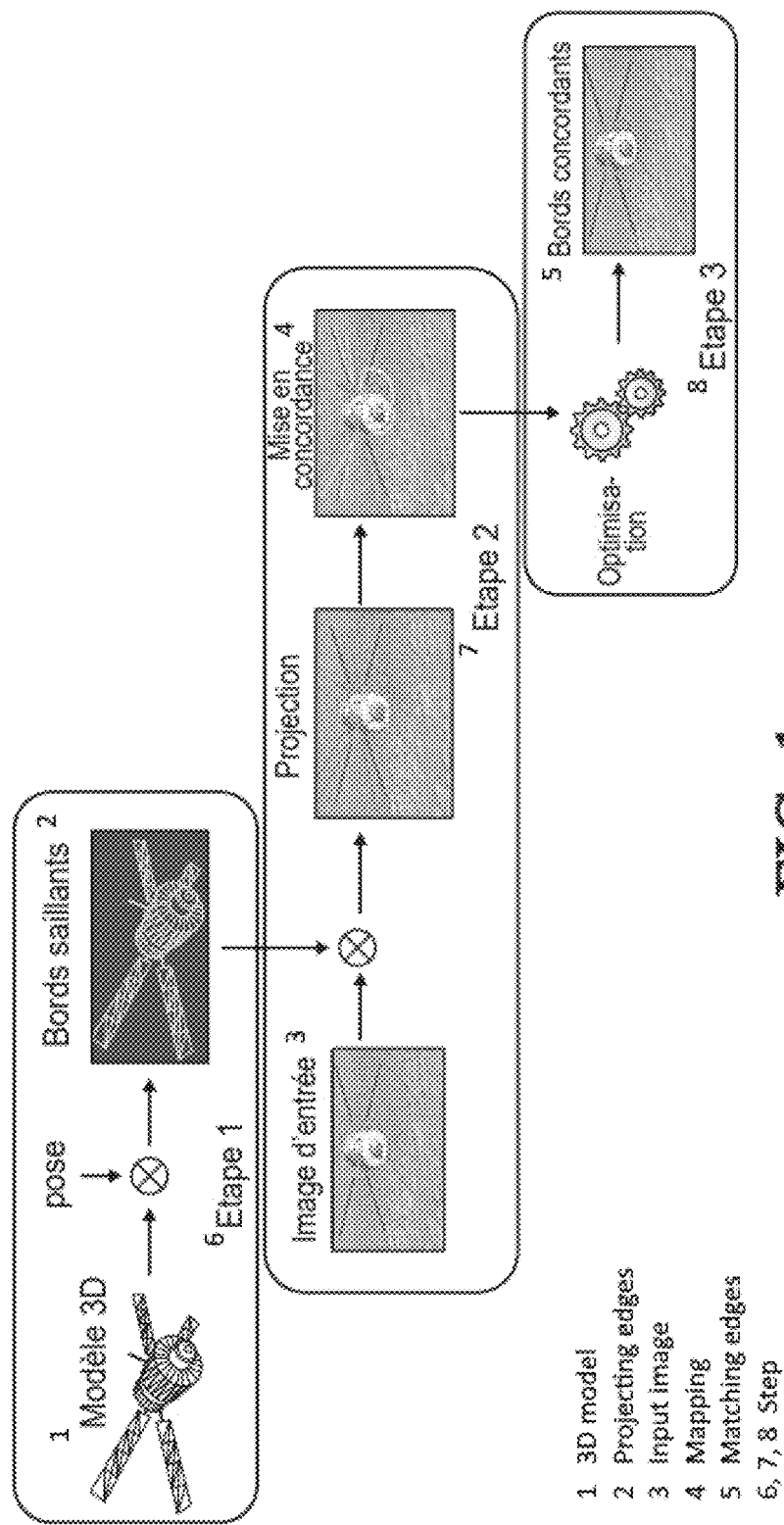
FIG. 1, already described, represents an exemplary context for the implementation of the invention, FIGS. 2*a* and 2*b* schematically represent two variants of a system for implementing the method.

The input data also comprises a three-dimensional model of the target, as well as an estimation, possibly approximate, of the pose of the target in the image. This estimation of the pose may come from a previously implemented step of detecting the target (see FIG. 1), or may come from a previous iteration of the method, or may come from a simulation of the relative positions of the vehicle and the target based on the theoretical trajectory of the vehicle.

The three-dimensional model of the target is advantageously a mesh of the target, meaning a set of faces forming the surface of the target. The faces are geometric shapes, the entire mesh being made of the same geometric shapes. For example, the faces may be triangular or polygonal, and are then defined by the three-dimensional coordinates of their vertices. Alternatively, the mesh subunits may be spheres or spheroids (in other words an ellipsoid of revolution), and are then defined by the three-dimensional coordinates of their center and their radius.

In the following, the method is described by taking the non-limiting example of a three-dimensional mesh in which the faces are triangular. We therefore denote as M(a, b, c) the triangle M defined by its vertices a, b, c, each vertex corresponding to a three-dimensional vertex.

With reference to FIG. 2*b*, the coordinates of a point of the mesh are defined in an orthonormal coordinate system in which the X and Y axes define the plane of the image captured by the sensor, and the Z axis corresponds to the optical axis of the sensor, which is directed towards the positive Zs. The position of a point on the Z axis corresponds to its proximity to the sensor, such that the smaller Z is, the closer the object is to the sensor. Z may possibly be negative, for example in the case of mooring a vessel to the International Space Station. The position of a point or an object on the Z axis will subsequently be called the depth.

As a preliminary, the input data (image of the target and three-dimensional mesh) are loaded or acquired by the computer 21 or 31 for implementation of the method. The method then comprises a step 100 of determining the projecting edges of the mesh of the object in the pose provided as input.

This step firstly comprises positioning 110 the three-dimensional mesh of the object according to said pose.

The pose p of the object comprises both the orientation of the object and its position relative to the vehicle; it therefore comprises a 3×3 rotation matrix denoted R, and a column vector of dimension 3 denoted T, corresponding to the translation. In the following, we denote p=(R,T).

Step 110 thus comprises the transposition of each face of the model according to the pose (R,T), which for a triangular mesh corresponds to calculating for each triangle M:

$$M'(a',b',c')=KR*M(a,b,c)+KT$$

where M' is the repositioned triangle corresponding to M, and a', b', c' are its coordinates, which are preferably ordered by their position on the Z axis. K is a 3×3 correction matrix obtained by calibration of the sensor 10; it is assumed to be known and constant.

Advantageously, but optionally, the method then comprises a step of filtering out 120 the faces of the three-dimensional mesh which are considered as not visible in the pose adopted in step 110 by the mesh, because these faces lie outside the space defined by the field of view of the sensor or upstream of the sensor with respect to the Z axis.

This step comprises the preliminary calculation, for each face, of the normal to the face. In the case of a triangle M(a, b, c), this calculation is implemented by:

$$n=(b-a)\wedge(c-a)$$

The normal of each face is adjusted according to the pose of the object:

$$n'=R*n$$

The filtering step 120 then comprises:
filtering out the faces whose normal is not oriented towards the sensor, in other words the faces satisfying the following relation:

$$n'(R*a+T)>0$$

then, a parameter $Z_{near}$ being defined as corresponding to the lowest position on the Z axis of a point so that it is visible to the sensor, step 120 also comprises filtering out the faces whose point of greatest depth Zmax is less than this:

$$Z_{max} \le Z_{near}$$

for all other faces, the face is retained if it is fully visible, and otherwise the face is cut to retain only the visible portions.

In the example of a triangular face, the depth $Z_{min}$ of the point of lowest depth is compared to $Z_{near}$, and we retain the faces for which:

$$Z_{near} < Z_{min}$$

In the reverse case:
if the other two vertices have a depth greater than $Z_{near}$, the face is divided into three sub-triangles defined with two new coordinates such that two of the three sub-triangles are visible, and the two sub-triangles have at least one of their vertices at a depth $Z=Z_{near}$, and these are retained,
if only one other vertex has a depth greater than $Z_{near}$, the face is divided into three sub-triangles defined with two new coordinates such that one of the three sub-triangles is visible and has at least one of its vertices at a depth $Z=Z_{near}$, and this one is retained.

The method then comprises a step 130 of projecting the three-dimensional mesh of the object so positioned into the plane (X,Y) of the image. If we consider a triangle M'(a', b', c'), this step is implemented by calculating the coordinates of the projected triangle M"(A', B', C') as follows:

$$A' = \left(\frac{a'_x}{a'_z}, \frac{a'_y}{a'_z}\right)$$

where $a'_x$, $a'_y$ and $a'_z$, are the X, Y and Z coordinates of a'. The same calculation is carried out mutatis mutandis for B' and C'.

The method then comprises a step 140 of processing the image by scanning the projection of the mesh with a set of scanning rows. This step is preferably carried out twice, once with scanning rows extending along the X axis, and once with scanning rows extending along the Y axis.

For the detailed description of the implementation of this step, let us take the example of scanning rows extending along the Y axis, the transposition to scanning rows extending along the X axis being made by replacing X by Y and vice versa.

Before implementing this scanning step, the coordinates of each projected face of the mesh are ordered along the axis of the scanning row, in other words along the Y axis in the example being described here. In addition, the normals to the sides of each face projected in the plane (X,Y) are also calculated.

During the scanning step, the image of the projected mesh according to the pose p=(R,T) is scanned by a set of scanning rows at a sampling rate defined beforehand or adapted dynamically according to a constraint to be satisfied in terms of the processing complexity. For example, there may be as many scanning rows as there are pixels on the Y axis, or every other row, or one in three.

Figure 4:
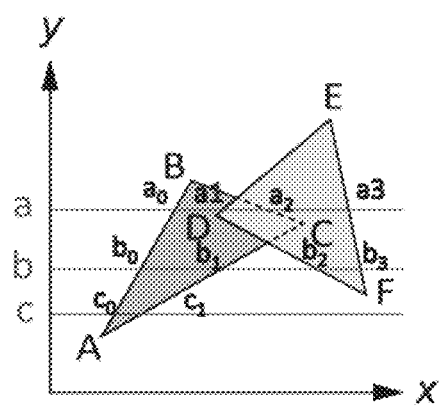
FIG. 4 represents an example of scanning a mesh in horizontal scanning rows.

The step of processing by scanning comprises a step 141 schematically represented in FIG. 4, during which, for each scanning row, a set of segments is defined at the intersection between the scanning row and a face of the mesh. Each segment is defined by:
the three-dimensional coordinates of its ends, the depth (position in Z) being determined from the coordinates of the vertices of the face to which the end belongs, and one of the other two coordinates being determined based on the scanning row that enabled obtaining the segment,
the normals to the sides of the projected faces to which the ends respectively belong,
a three-dimensional normal to the face to which the segment belongs, and
an identifier for the segment.

In the example shown in FIG. 4, we thus obtain:
when scanning row a, two segments $[a_0, a_2]$ and $[a_1, a_3]$,
when scanning row b, two segments $[b_0, b_1]$ and $[b_2, b_3]$, and
when scanning row c, one segment $[c_0, c_1]$.

It is therefore clear that each segment is defined in three dimensions, because its ends have three-dimensional coordinates, but it is obtained from the intersection of a scanning row and a two-dimensional projection of the mesh.

The ends of the segments thus defined are therefore candidates for mapping to the projecting edges of the mesh of the object in the pose (R,T).

The method then comprises selecting 142 the ends of the segments corresponding to the projecting edges by analyzing the relative depths of said ends and the associated normals.

For each scanning row, the coordinates of the set of the ends of the segments defined for the considered scanning row are ordered on the axis orthogonal to the axis of the line, in other words the X axis in the example being described. To revisit the above example, the ends of the segments of a scanning row a are ordered as follows: $a_0, a_1, a_2, a_3$.

Then each scanning row is again traveled starting from the origin. At each encountered segment end, in a substep 1420 the segments that are stacked at said end are determined by associating with said end the identifier of the superimposed segments and the recalculated Z position of each segment stacked at said end. This can be done by creating a set to which the segment identifier and Z position are added when the encountered end opens the segment, and by removing these data when the encountered end closes the segment.

Still during the course of traveling a scanning row, the method comprises, for each encountered end, selecting 1421 the point of the segment that is closest to the sensor among the stacked segments at that end, in other words the point having the lowest Z coordinate: it is this point which is visible to the sensor, even if it does not necessarily correspond to a projecting edge of the object. To use the example described with reference to FIG. 4, for scanning row a the end points $a_0$, $a_1$ and $a_3$ are retained.

The method then comprises a step 1422 of selecting, among the visible edges, those which are projecting (salient). This step is implemented during the same traveling of the scanning row as steps 1420 and 1421.

To determine whether a selected point is a projecting edge of the object, the Z coordinate of the selected point is compared to the Z coordinate at the same point of the last segment considered to be visible when traveling the row. If there is a difference between these coordinates that is greater than a predetermined threshold, then a depth continuity break is detected and the point corresponds to a projecting edge. The predetermined threshold is adjusted to take into account only clear continuity breaks and to avoid selecting irrelevant details. In the example described above, the points $a_0$, $a_1$ and $a_3$ all belong to projecting edges because they are located at depth continuity breaks in the corresponding faces. During initialization, the first point crossed is considered to be visible.

Otherwise, the direction of the normal of the selected point is compared to the direction of the normal to the face to which the last visible segment belongs. The "normal of the selected point" is the normal to the face to which the segment in which the selected point is located belongs.

This comparison is typically performed by calculating the dot product between the normals and comparing the result to a predetermined threshold.

If a difference exists between these directions that is greater than a predetermined threshold, then a discontinuity in the orientation of the faces to which the points belong is detected, and the point corresponds to a projecting edge. If they are identical, then the point corresponds to a non-projecting edge shared between two faces.

Each point considered to be a projecting edge of the model is added to a set E in the form of an element $e_i = (X_i, proj_p(X_i), n_i)$ of the mesh, defined by the following data:
the three-dimensional coordinates of point $X_i$ in the mesh,
the coordinates of the point in the two-dimensional projection of the mesh $proj_p(X_i)$, and
the normal ni to the two-dimensional projection from the side of the face to which the point belongs.

In some embodiments, the elements of the set may also comprise additional information, for example such as an identification element, a confidence index or a weighting coefficient, etc.

The elements of the set are stored in memory 22 or in memory 32 depending on the embodiment of the invention.

At the end of step 100, a set of projecting edges of the model in the pose (R,T) of the object in the image has therefore been constructed, using only the ends of segments at the intersection of faces and scanning rows. The method described above makes it possible to avoid reconstructing all the segments so defined and analyzing, pixel by pixel, which faces are visible in the pose under consideration. The method is therefore particularly inexpensive in computing time.

According to an advantageous variant of the invention, this step 100 is implemented by a ground station (as in FIG. 2b), as a preliminary to any rendezvous operation.

It is indeed possible, depending on the approach path of an object, to provide a predictable pose that the target will have in the image captured from the approaching vehicle, this pose being used for implementing step 100.

This typically makes it possible to implement other processing, for example the selection, by an operator, of the more relevant elements of the set, by allocating weighting coefficients relating to each element. For example, for an irrelevant element, it can be associated with a very low or zero weighting coefficient, or even eliminated, and for a highly relevant element it can be associated with a higher weighting coefficient.

It is also possible in this case to calculate a set of projecting edges of an object, based on several predetermined poses. Then, during a phase of a vehicle approaching a target, the processing system on board the vehicle can choose the set of projecting edges corresponding to the pose closest to the actual pose of the target in the image among the set of predetermined poses. In this manner, there is no need to implement step 100 in the vehicle (which has limited processing means) to directly obtain a fairly relevant set of projecting edges.

Revisiting FIG. 3, once the projecting edges of the mesh of the object are determined, the method comprises a step 200 of mapping these edges to the edges of the object in the image. However, this step is implemented by the onboard computer 21 of the vehicle.

During this step, for each element of the previously constructed set of projecting edges, an edge search window centered on the pixel of the input image corresponding to the two-dimensional position of the element is generated (position of the projection of the point in the pose (R,T)).

This window is constructed so that it extends in the direction of the normal to the element, on each side of this two-dimensional position. The width of the window is one pixel, and the length is chosen according to the amplitude of the movement expected in the image: for example it may be between 5 and 30 pixels for an image of 2048 by 2048 pixels. The length can be fixed by determining a half-length which extends along the normal in each of the two possible directions with respect to the pixel in question. The length is twice the half-length plus the pixel concerned.

The method then comprises implementing an edge detection algorithm in the pixels contained in the window. The algorithm is preferably the Deriche algorithm known to those skilled in the art.

For each element, a pixel of the image is selected as corresponding to the element in the image; the pixel of the image corresponding to element ei is denoted $x_i$.

Advantageously, once the mapping has been obtained, the method comprises an optimization step 300 intended to improve the estimation of the pose used as input, and to provide the improved pose as input to the next iteration of the method.

This optimization step is implemented by minimizing the offset between the projection of the elements of the set of projecting edges obtained at the end of step 100 and the positions of the corresponding points of the image identified in step 200. This minimization is achieved by the least squares method implemented by the following calculation:

$$\min_p \sum_{e \in E} f([proj_p(X_i) - x_i] \cdot n_i]^2)$$

where f is a cost function, for example defined as follows:
$f(x) = \log(1+x)$, $f(x) = 2 \times (\sqrt{1+x} - 1)$, or $f(x) = x$.

Advantageously, the function f can be chosen to enable mitigating the contribution of deviating or isolated elements relative to the others. In this respect, it can also take into account additional data concerning the elements of the set of projecting edges, typically such as a confidence index or a weighting coefficient.

During implementation of this step, the elements e of the set E remain the same, meaning that their three-dimensional position is identical. What changes is the position of their projection onto the plane of the image, which depends on the pose p which is updated at the end of this optimization step.

In an advantageous embodiment of step 300, one can exploit the fact that the position is known, both in the pose and in the absolute location of the approaching vehicle, in order to deduce the position of the target relative to the vehicle. Therefore, we can deduce the rotation vector R of the pose p=(R,T). In step 300, the only optimization then concerns the translation vector T.

To do this, by denoting as O the optical center of the sensor in the reference system of the target, and as $U_i$ the unit vectors whose direction is that of the points $x_i$ in the reference system of the camera, then for each $(x_i, n_i)$ there exists a single plane containing O and which intersects the image plane at $x_i$ in a straight line orthogonal to $n_i$. We denote the normal to this plane as $N_i$.

We can calculate the position of O, knowing $X_i$ and $N_i$, with the following method:

$$A_i = N_i^t N_i$$
$$A = \sum_i A_i$$
$$B = \sum_i A_i X_i$$
$$C = A^{-1} B$$

The position of the target in the sensor reference system is therefore -C. To be able to apply this formula, it is necessary that A be reversible, which requires having at least three elements $(X_i, x_i, n_i)$. This determination of the position can be implemented by a RANSAC type of method implemented by the onboard computer 21.

The method can then be repeated, with the pose p updated at the end of step 300, and for a new image from the image stream coming from the sensor. In some cases, for example for which the initial estimation of the pose was very approximate and the image capture rate of the sensor is low, the method can also be repeated with the updated pose for the same image.

Alternatively, instead of repeating step 100 above, the method may comprise a step 400 in which only the positions of the two-dimensional projections of the elements are recalculated with the updated pose, based on the principle that the visible elements vary only slightly and that the loss of precision related to this partial calculation is low.

Step 400 is then followed by a new occurrence of step 200 in order to find the corresponding points in the image, and of step 300 in order to refine the pose.

In this case, the method is advantageously implemented by the system described with reference to FIG. 2b, comprising an onboard processing unit 20 and a processing unit on the ground 30. In fact, the calculations of step 100 are then preferably executed by the computer 31 of the processing unit on the ground 30 and only steps 200, 300, and 400 are performed by the computer 21 of the onboard processing unit. The calculations of step 100 may even be carried out before a mission based on a prior estimate of the pose of the object in the image based on how the mission will theoretically proceed. The elements obtained at the end of step 100 can therefore be loaded into the memory 22 of the onboard processing unit 20.

By limiting the involvement of the onboard computer to only steps 200, 300 and 400, it is thus possible to make computing time available to the computer so that it can perform other processing. This embodiment also simplifies the design of the memory and its integration since the size of the onboard memory required to store them is known, the elements being precalculated.

According to another variant, in certain iterations the method may comprise a partial implementation of step 100. In this case, during an implementation of step 100, the step 140 of scanning the projection of the object model is implemented only for some, and not all, scanning rows, in other words for example for a projection strip of a certain width, the next implementation of step 100 comprising the implementation of step 140 for other scanning rows, etc. This makes it possible to distribute the most computing-intensive part of the method across several iterations.

According to another variant embodiment, which can be combined with the various variants described above, the three-dimensional model of the object may comprise several sub-parts, particularly if there are several possible configurations of the target.

In this case, each point of the mesh is defined not only by its coordinates in three dimensions, but also by data indicating the part of the mesh to which it belongs. Each element of the set of projecting edges then also comprises a data item indicating the part of the mesh to which it corresponds. Preliminary image processing of the target can determine the parts of the mesh that are present, and in this case the implementation of steps 130 and 140 only occurs on those parts of the mesh that are visible.

The invention claimed is:

1. A method for locating a three-dimensional target with respect to a vehicle, implemented by a system comprising a sensor suitable for capturing images of the target, and a computer, and comprising:
   capturing an image of the target, and
   from a three-dimensional mesh of the target, and from an estimation of the pose of the target, determining a set of projecting edges of the mesh of the target in said pose, and
   wherein determining the projecting edges of the mesh of the target comprises:
   a) positioning the mesh of the target according to the pose,
   b) projecting in two dimensions the mesh so positioned,
   c) scanning the projection of the mesh with a plurality of scanning rows and, for each scanning row:
   defining a set of segments, each segment corresponding to the intersection of a face of the mesh with the scanning row and being defined by its ends,
   analyzing the relative depths of the ends of the segments, the depth being the position along a third dimension orthogonal to the two dimensions of the projection, in order to select a set of end points of segments corresponding to projecting edges of the mesh,
   wherein analyzing the relative depths of the ends of the segments comprises, for each segment end of a scanning row:
   determining the set of superimposed segments at said end,
   calculating the depth of the points of each of the superimposed segments at the segment end considered, selecting the point having the lowest depth,
comparing the depth of the selected point to the depth of the last visible segment at the selected point, and
if the difference is greater than a determined threshold, determining that the selected point corresponds to a projecting edge of the mesh.

2. The method according to claim 1, wherein each segment is further defined by the normal to the face to which the segment belongs,
and analyzing the relative depths of the ends of the segments further comprises, if the difference between the depth of the selected point and the depth of the last visible segment at the selected point is less than said threshold:
comparing the direction of the normal to the face to which the segment in which the selected point belongs, with the direction of the normal to the face to which the last visible segment belongs, and
if the difference is greater than a determined threshold, determining that the selected point corresponds to a projecting edge of the mesh.

3. The method according to claim 2, wherein projecting the mesh in two dimensions further comprises calculating normals to the sides of the projection of each face of the mesh.

4. The method according to claim 1, wherein the scanning step c) is carried out once with horizontal scanning rows, and once with vertical scanning rows.

5. The method according to claim 1, wherein the faces of the mesh are triangular, and are defined by the spatial coordinates of the vertices of the triangle.

6. The method according to claim 1, further comprising, once the projecting edges of the mesh of the target are determined, mapping the projecting edges of the mesh of the target to edges of the target in the image.

7. The method according to claim 6, further comprising updating the estimation of the pose of the target in the image by minimizing the offset between the projecting edges of the mesh of the target and the corresponding points of the image.

8. The method according to claim 7, wherein the set of projecting edges of the mesh of the target comprises a set of elements of the mesh, each element being defined by:
the spatial coordinates of a point of the mesh,
the coordinates of the two-dimensional projection of said point of the mesh, positioned according to said pose, and
the direction of the normal of the mesh face in two dimensions at said point,
the method further comprising:
for each element of the mesh belonging to the set of projecting edges of the mesh, updating the coordinates of the two-dimensional projection of the point of the mesh, then
repeating the step of mapping the projecting edges of the mesh to the edges of the target in the image.

9. The method according to claim 1, wherein the set of projecting edges of the mesh of the target comprises a set of elements of the mesh, each element being defined by:
the spatial coordinates of a point of the mesh,
the coordinates of the two-dimensional projection of said point of the mesh, positioned according to said pose, and
the direction of the normal of the mesh face in two dimensions at said point.

10. The method according to claim 9, further comprising, once the projecting edges of the mesh of the target are determined, a step of mapping the projecting edges of the mesh of the target to edges of the target in the image, wherein the mapping step comprises superimposing the two-dimensional projection of the mesh on the image, and for each element:
defining a window extending along the normal of the element,
detecting an edge in the portion of the image corresponding to the window, and
selecting a pixel of the image corresponding to the detected edge, as corresponding to the element.

11. The method according to claim 1, wherein the step of determining the projecting edges of the mesh is implemented in a preliminary manner by a first computer of a ground station.

12. The method according to claim 11, further comprising an assignment of weighting coefficients to the elements of the set of projecting edges.

13. The method according to claim 11, comprising determining sets of projecting edges of the mesh positioned in a plurality of predetermined poses by the first computer, the method further comprising selecting a set of projecting edges of the mesh in one of the predetermined poses which best matches the pose of the target in the image, and implementing a mapping step on said selected set, wherein the mapping step comprises superimposing the two-dimensional projection of the mesh on the image, and for each element:
defining a window extending along the normal of the element,
detecting an edge in the portion of image corresponding to the window, and
selecting a pixel of the image corresponding to the detected edge, as corresponding to the element.

14. The method according to claim 1, wherein the mesh of the target comprises several distinct parts and the steps of projecting the mesh in two dimensions and scanning the projection of the mesh are only implemented for the parts of the mesh corresponding to parts of the target that are present in the image.

15. A system for locating a three-dimensional target with respect to a vehicle, comprising a sensor suitable for capturing images of the target, and a control unit comprising a computer and a memory, wherein the system is configured to implement the method according to claim 1.

16. A non-transitory computer readable medium, comprising instructions for implementing a method for determining the projecting edges of a mesh of a three-dimensional object positioned according to a determined pose, comprising:
a) positioning the mesh of the object according to the pose,
b) projecting in two dimensions the mesh so positioned,
c) scanning the projection of the mesh in a plurality of scanning rows and, for each scanning row:
defining a set of segments, each segment corresponding to the intersection of a face of the mesh with the scanning row and being defined by its ends,
analyzing the relative depths of the ends of the segments, the depth being the position along a third dimension orthogonal to the two dimensions of the projection, in order to select a set of end points of segments corresponding to the projecting edges of the mesh,
when it is implemented by a computer,
wherein analyzing the relative depths of the ends of the segments comprises, for each segment end of a scanning row:

determining the set of superimposed segments at said end,
calculating the depth of the points of each of the superimposed segments at the segment end considered,
selecting the point having the lowest depth,
comparing the depth of the selected point to the depth of the last visible segment at the selected point, and
if the difference is greater than a determined threshold, determining that the selected point corresponds to a projecting edge of the mesh, and
mapping the projecting edges of the mesh of the target to edges of the target in the image.

* * * * *